United States Patent
Maruyama

[11] Patent Number: 5,907,162
[45] Date of Patent: May 25, 1999

[54] LIGHT-EMITTING DEVICE AND METHOD FOR MANUFACTURING THE SAME

[75] Inventor: Hideki Maruyama, Chikushino, Japan

[73] Assignee: Matsushita Electric Industrial Co., LTD., Osaka, Japan

[21] Appl. No.: 08/854,140

[22] Filed: May 9, 1997

[30] Foreign Application Priority Data

May 14, 1996 [JP] Japan .................................. 8-118700

[51] Int. Cl.⁶ .................................................. H01L 33/00
[52] U.S. Cl. .............................................. 257/98; 257/100
[58] Field of Search ................................. 257/98, 82, 91, 257/99, 100

[56] References Cited

U.S. PATENT DOCUMENTS

| | | | |
|---|---|---|---|
| 3,739,241 | 6/1973 | Thillays | 317/235 R |
| 4,703,219 | 10/1987 | Mesquida | 257/98 |
| 4,830,453 | 5/1989 | Khoe | 257/98 |
| 5,105,237 | 4/1992 | Hasegawa et al. | 257/98 |
| 5,221,641 | 6/1993 | Kurita et al. | 437/211 |
| 5,260,587 | 11/1993 | Sato | 257/98 |
| 5,465,265 | 11/1995 | Ota | 257/98 |
| 5,604,361 | 2/1997 | Isaksson | 257/98 |
| 5,633,527 | 5/1997 | Lear | 257/98 |
| 5,665,983 | 9/1997 | Nagano | 257/98 |

Primary Examiner—David B. Hardy
Assistant Examiner—Huy Bui
Attorney, Agent, or Firm—Stevens, Davis, Miller & Mosher, L.L.P.

[57] ABSTRACT

The present invention aims to provide a highly reliable light-emitting device capable of simplifying alignment of optical axes of light-emitting element and optical fiber and making optical coupling between them with high efficiency, and a light-emitting device manufacturing method, by which such light-emitting device can be manufactured with high productivity. Since a lens made of radiation sensitive resin is formed directly on a light-emitting element to be located just above a light-emitting surface, it becomes possible to provide a highly reliable light-emitting device capable of allowing the optical axes of the light-emitting element and the optical fiber to be aligned more easily and making optical coupling between them with high efficiency. Further, it becomes possible to provide a manufacturing method capable of manufacturing a highly reliable light-emitting device and comprising the steps of forming a resist layer on a light-emitting element wafer having a plurality of light-emitting surfaces, masking portions of the resist layer just above the light-emitting surfaces, removing the resist layer except the masked portions, and shaping the resist layer into lenses.

32 Claims, 5 Drawing Sheets

LIGHT-EMITTING DEVICE AND METHOD FOR MANUFACTURING THE SAME

BACKGROUND OF THE INVENTION

This invention relates to a light-emitting device and a method for manufacturing the same, and more particularly to a light-emitting device with lens function and a method for manufacturing the same.

Examples of light-emitting element used for optical communication are a semiconductor laser and a LED. In order to optically couple such light-emitting element highly efficiently and easily to an optical fiber which is an optical transmission medium, rapid developments are being made on a light-emitting element module of the type in which a light-emitting element and a lens are combined and a light-emitting device of the type in which a light-emitting element itself is given with lens function. These conventional light-emitting devices will be described by referring to FIGS. 6 to 8.

Figure 6:
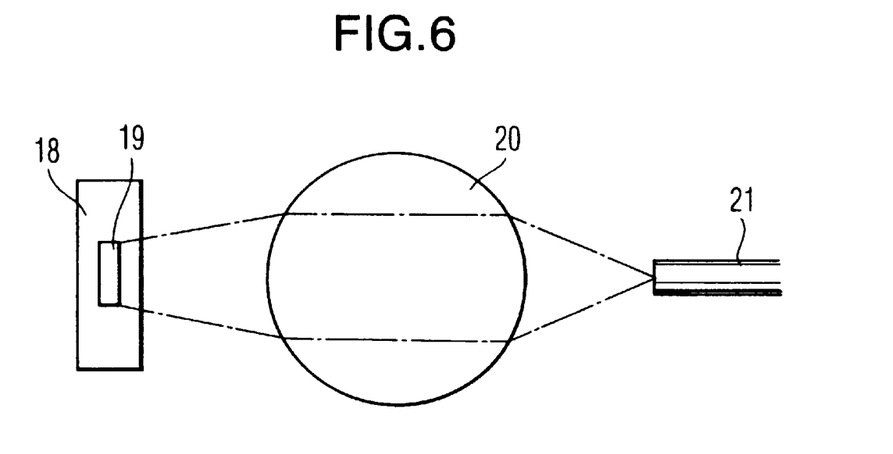
FIG. 6 is a schematic sectional view showing a state of optical coupling between a light-emitting element, a lens and an optical fiber which are disposed separately.
Figure 7:
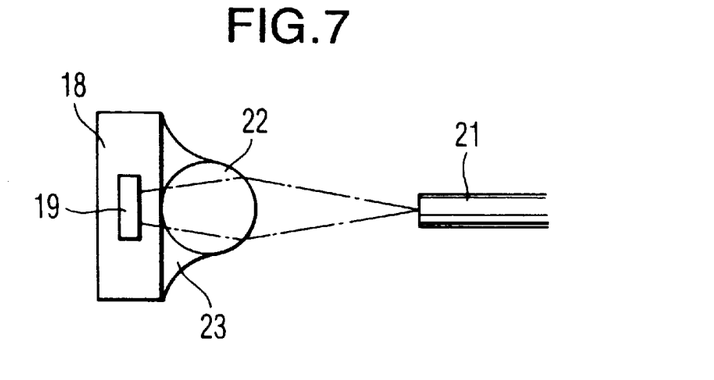
FIG. 7 is a schematic sectional view showing a state of optical coupling between a light-emitting device having an integral lens and an optical fiber.
Figure 8:
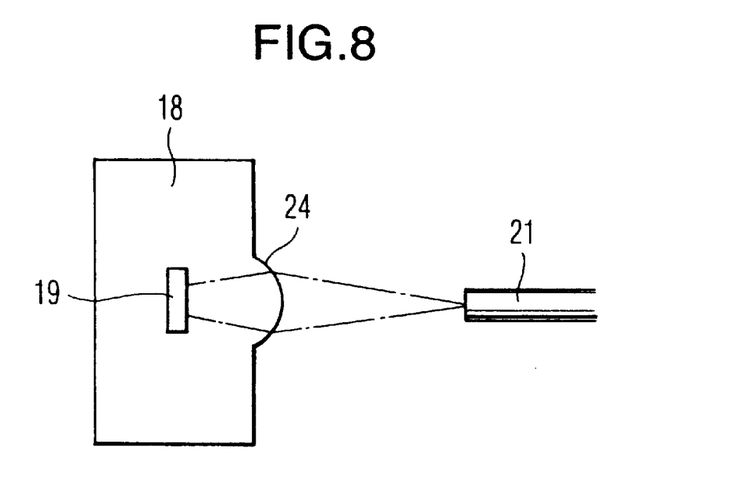
FIG. 8 is a schematic sectional view showing a state of optical coupling between a light-emitting device a portion of which is shaped in the form of a lens and an optical fiber.

FIG. 6 is a schematic sectional view showing a state of optical coupling between a light-emitting element, a lens and an optical fiber which are disposed separately, FIG. 7 is a schematic sectional view showing a state of optical coupling between a light-emitting device having an integral lens and an optical fiber, and FIG. 8 is a schematic sectional view showing a state of optical coupling between a light-emitting device a portion of which is lens-shaped and an optical fiber. In FIGS. 6 to 8, the reference numeral 18 denotes a light-emitting element, 19 a light-emitting surface, 20 a lens, 21 an optical fiber, 22 a lens united with the light-emitting element, 23 an adhesive, and 24 a lens formed in a portion of the light-emitting device. As shown in FIG. 6, when disposing the light-emitting device 18 and the lens 20 as separate parts, the optical axes of the lens 20 and the optical fiber 21 are each required to be aligned with that of the light-emitting element 18 so that the efficiency of optical coupling between the light-emitting element 18 and the optical fiber 21 is increased, and therefore the optical axis alignment is troublesome and takes a considerable length of time. To cope with this, the lens 22 is placed just above the light-emitting surface 19 and fixed to the light-emitting element 18 with the adhesive 23 so that the lens 22 is united with the light-emitting element 18 as shown in FIG. 7, and a portion of the light-emitting element 18 located just above the light-emitting surface 19 is lens-shaped so as to give the lens function to the light-emitting device as shown in FIG. 8, in which cases the optical axis alignment can be simplified because the separate operation for aligning the optical axis of the lens can be dispensed with and the number of parts required for the coupling between the light-emitting device and the optical fiber can be decreased.

However, in the conventional light-emitting device with lens function described above, when fixing the lens to the light-emitting element with an adhesive and the like, there are involed problems that the process of gluing the lens to the light-emitting element is needed and that the glued portion between the light-emitting element and the lens lacks in long-term stability and reliability. Meanwhile, in the light-emitting device a portion of which is lens-shaped as well, since the process of shaping into the lens form, e.g., ion etching, is still in the technologically developing stage, there is involved a problem that it is difficult to shape into the desired form and hence the efficiency of optical coupling to the optical fiber is low and the productivity of the light-emitting device is low.

The present invention aims to solve the above problems of the prior arts and an object of the invention is to provide a highly reliable light-emitting device which is constructed such that a lens made of radiation sensitive resin is formed directly on a light-emitting element so as to be located just above a light-emitting surface and which is capable of allowing the optical axes of the light-emitting element and optical fiber to be aligned more easily and making optical coupling between them with high efficiency, and a light-emitting device manufacturing method capable of manufacturing a highly reliable light-emitting device with high productivity, which device is capable of allowing the optical axes of the light-emitting element and optical fiber to be aligned more easily and making optical coupling between them with high efficiency.

SUMMARY OF THE INVENTION

A light-emitting device of the present invention is constructed such that a lens made of radiation sensitive resin is formed directly on a light-emitting element so as to be located just above a light-emitting surface. This construction makes it possible to provide a highly reliable light-emitting device capable of allowing the optical axes of the light-emitting element and optical fiber to be aligned more easily and making optical coupling between them with high efficiency. Further, a light-emitting device manufacturing method of the invention comprises the steps of forming a resist layer made of radiation sensitive resin on a light-emitting element wafer having a plurality of light-emitting surfaces or on a foundation film formed on a light-emitting element wafer having a plurality of light-emitting surfaces, masking portions of the resist layer which has been formed in the resist layer forming step, just above the respective light-emitting surfaces in a predetermined area, removing the resist layer from the light-emitting element wafer except for the portions of the resist layer masked in the masking step, and shaping the resist layer which has been left on the light-emitting element wafer in the resist layer removing step, into hemispheric or pseudo-hemispheric lenses. This method makes it possible to provide a light-emitting device manufacturing method capable of producing a highly reliable light-emitting device with high productivity, which device is capable of allowing the optical axes of the light-emitting element and optical fiber to be aligned more easily and making optical coupling between them with high efficiency.

DETAILED DESCRIPTION OF THE INVENTION

In the present invention, a lens made of radiation sensitive resin is formed directly on a light-emitting element so as to be located just above a light-emitting surface, and therefore it is possible to obtain a highly reliable light-emitting device capable of allowing the optical axes of the light-emitting element and optical fiber to be aligned more easily and making optical coupling between them with high efficiency.

Radiation sensitive resin which may be used can be obtained from (A) a radiation sensitive resin composition containing an alkali-soluble resin, a radiation sensitive acid forming compound, and a compound having at least two epoxy groups in the molecule, (B) a radiation sensitive resin composition containing an alkali-soluble polymer which is a homopolymer of p-hydroxy styrene class or a copolymer of p-hydroxy styrene class and styrene class and in which structure units originating from p-hydroxy styrene class occupy at least 70 mole percent, 1,2 naphthoquinonediazido sulfonic acid ester, and a compound having at least two epoxy groups in the molecule, (C) a radiation sensitive resin composition containing an alkali-soluble resin, 1,2 quinonediazido compound, a compound having two or more epoxy groups in the molecule, melamine class, and trihalomethyl triazine class or onium salt class, (D) a radiation sensitive resin composition containing an unsaturated calboxylic acid and/or an unsaturated calboxylic acid anhydride, an epoxy group containing radical polymeric compound, and a resin and radiation absorbent compound made of a copolymer of mono- and/or diolefin based unsaturated compound, and the like. However, this is not limitative and any thermosetting resin with high refractive index will do, provided that it hardens when applied with radioactive rays, it can change its shape by heat treatment, and it has a high thermal distortion resistance and an excellent transparency after the heat treatment.

In the present invention, a lens is formed directly on a foundation film formed on a surface of a light-emitting element, and therefore unevenness of the surface of the light-emitting element is smoothed and clinging performance between the light-emitting element and the lens is improved by the foundation film.

The foundation film is made of a thermosetting resin which has a heat resistance against the heat treatment carried out when forming the lens made of radiation sensitive resin on the light-emitting element and which does not chemically react with the light-emitting device and radiation sensitive resin.

In any of the above inventions, the light-emitting device has a plurality of light-emitting surfaces and a plurality of lenses associated with the respective light-emitting surfaces, and therefore it is possible to obtain a light-emitting device capable of making optical coupling to an optical fiber array, in which a plurality of optical fibers are arranged, with high efficiency and easily.

In any of the above inventions, the light-emitting element is a surface luminous type semiconductor laser or a surface luminous type LED, and therefore diverging rays of the light emitted from the light-emitting surface of the surface luminous type semiconductor laser or the surface luminous type LED can be optically coupled to the optical fiber with high efficiency and without difficulty.

In any of the above inventions, rays of the light emitted from the light-emitting element to pass through the lens are converged to form a spot of a predetermined diameter at a predetermined point, and therefore the light having passed through the lens can be optically coupled to a core portion of a single-mode fiber or multimode fiber with high efficiency and without difficulty.

In the above invention, the spot diameter is in the range of 8 to 60 $\mu$m, preferably in the range of 10 to 50 $\mu$m, and therefore the efficiency of optical coupling to the core portion of the single-mode fiber or multimode fiber is improved. As the spot diameter is made smaller than 10 $\mu$m, it becomes smaller than a mode field diameter of the single-mode fiber and hence the efficiency of optical coupling to the single-mode fiber shows a tendency to decrease, while as the spot diameter is made larger than 50 $\mu$m, it becomes larger than a core diameter of the multimode fiber and hence the efficiency of optical coupling to the multimode fiber shows a tendency to decrease, neither of which is advisable.

In any of the above inventions, rays of the light emitted from the light-emitting element to pass through the lens are focused into a parallel beam in a predetermined direction, and therefore it becomes possible for the parallel beam to be optically coupled to the optical fiber after being converged with a lens which is a separate part, and it is possible to increase the tolerance required for aligning the optical axes of the light-emitting element and the optical fiber in both horizontal and vertical directions of the optical axis.

According to the invention, there is provided a light-emitting device manufacturing method comprising the steps of forming a resist layer made of radiation sensitive resin on a light-emitting element wafer having a plurality of light-emitting surfaces, masking certain portions of the resist layer, which has been formed in the resist layer forming step, just above the respective light-emitting surfaces in a predetermined area, removing a part of the resist layer from the light-emitting element wafer except for those portions, which are masked in the masking step, and shaping the resist layer, which is left on the light-emitting element wafer in the resist layer removing step, into hemispheric or pseudo-hemispheric lenses. The method of the invention can manufacture a highly reliable light-emitting device with high productivity, which device is capable of allowing the optical axes of the light-emitting element and optical fiber to be aligned more easily and making optical coupling between them with high efficiency.

According to the invention, there is also provided a light-emitting device manufacturing method comprising the steps of forming a foundation film on a light-emitting element wafer having a plurality of light-emitting surfaces; forming a resist layer made of radiation sensitive resin on the foundation film, which is formed in the foundation film forming step, masking portions of the resist layer, which are formed in the resist layer forming step, just above the respective light-emitting surfaces in a predetermined area, removing a portion of the resist layer from the light-emitting element wafer except for those portions of the resist layer, which are masked in the masking step, and shaping the resist layer, which is left on the light-emitting element wafer in the resist layer removing step, into hemispheric or pseudo-hemispheric lenses. This invention has an effect that since unevenness of a surface of the light-emitting element is smoothed owing to the foundation film, it is possible to highly productively manufacture a highly reliable light-emitting device capable of allowing the optical axes of the light-emitting element and optical fiber to be aligned more easily and making highly efficient optical coupling between them as well as high clinging performance between the light-emitting device and the lens.

Now, description will be given of preferred embodiments of the present invention with reference to FIGS. 1 to 4.

Figure 1:
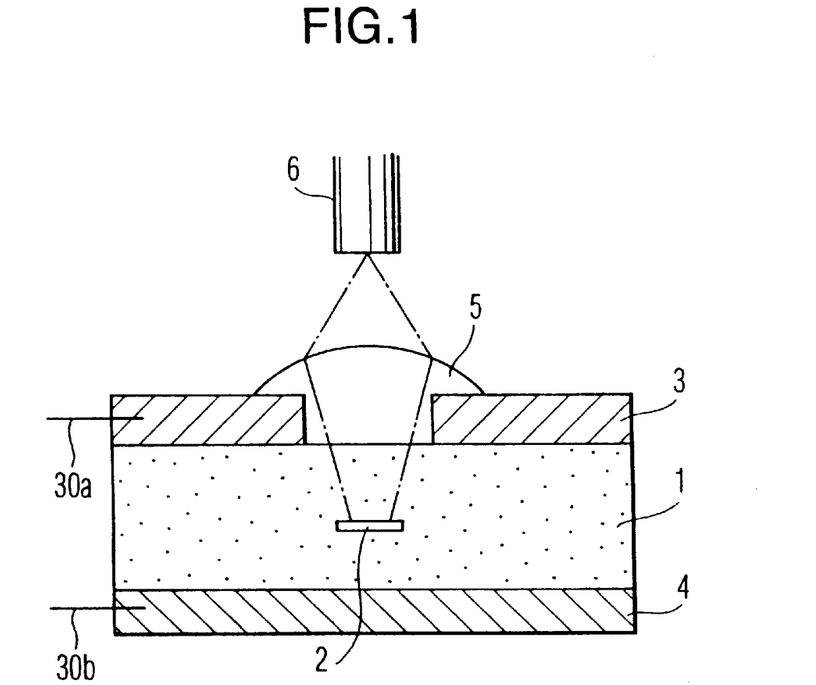
FIG. 1 is a schematic sectional view showing a state of optical coupling between a light-emitting device according to a first embodiment of the invention and an optical fiber.

FIG. 1 is a schematic sectional view showing a state of optical coupling between a light-emitting device according to a first embodiment of the invention and an optical fiber. In FIG. 1, the reference numeral 1 denotes a light-emitting element, 2 a light-emitting surface, 3 an upper electrode, 4 a lower electrode, 5 a lens, 6 an optical fiber, and 30a, 30b lead wires connected to the upper and lower electrodes 3, 4, respectively. The light-emitting element may employ a surface luminous type semiconductor laser, a surface luminous type LED and the like, while the optical fiber may employ a single-mode fiber, a multimode fiber and the like. Referring to FIG. 1, as a predetermined electric current is passed through the upper and lower electrodes 3, 4 partly formed on the light-emitting element 1 using an electrode driving device (not shown) connected by means of the lead wires 30a, 30b, light emitted from the light-emitting surface 2 is converged with the lens 5 made of radiation sensitive resin and formed just above the light-emitting surface 2 of the light-emitting device 1, and then coupled to the optical fiber 6.

As described above, according to this embodiment, the lens made of radiation sensitive resin is formed directly on the light-emitting element so as to be located just above the light-emitting surface, and therefore it becomes possible to allow the optical axes of the light-emitting element and the optical fiber to be aligned more easily and make optical coupling between them with high efficiency.

Figure 2:
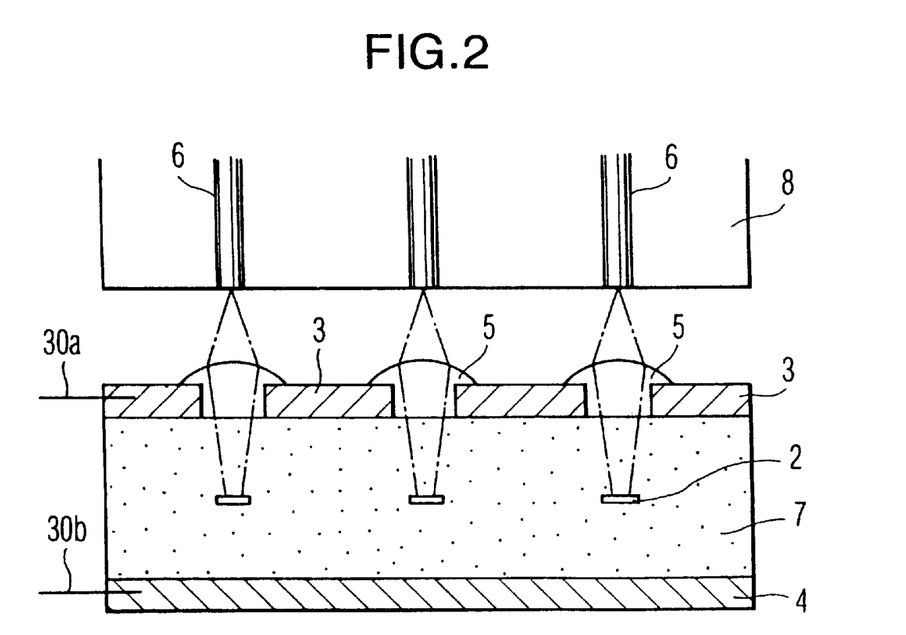
FIG. 2 is a schematic sectional view showing a state of optical coupling between a light-emitting device according to a second embodiment of the invention and optical fibers.

FIG. 2 is a schematic sectional view showing a state of optical coupling between a light-emitting device according to a second embodiment of the invention and optical fibers.

In FIG. 2, the reference numeral 7 denotes a light-emitting element and 8 denotes an optical fiber array. The light-emitting surface 2, upper electrode 3, lower electrode 4, lens 5, optical fiber 6, and lead wires 30a, 30b are the same as those of the first embodiment, and therefore they are designated by the same reference numerals, respectively, and description thereof is omitted. As shown in FIG. 2, the light-emitting element 7 has a plurality of light-emitting surfaces 2. Light emitted from each of the light-emitting surfaces 2 is converged through the lens 5, which is made of radiation sensitive resin and formed just above the associated one of the light-emitting surfaces 2, and then coupled to the associated one of a plurality of optical fibers 6 arranged in the optical fiber array 8.

As described above, according to this embodiment, the lenses made of radiation sensitive resin are formed directly on the light-emitting element having a plurality of light-emitting surface so as to be associated with the respective light-emitting surfaces, and therefore the optical axes of the light-emitting element having a plurality of light-emitting surfaces and the optical fiber array can be aligned more easily, and the light emitted from each of the light-emitting surfaces can be optically coupled to the associated one of the optical fibers with high efficiency.

Incidentally, the number of light-emitting surfaces of the light-emitting element and the number of optical fibers arranged in the optical fiber array are each three in FIG. 2, but this is not limitative.

Figure 3:
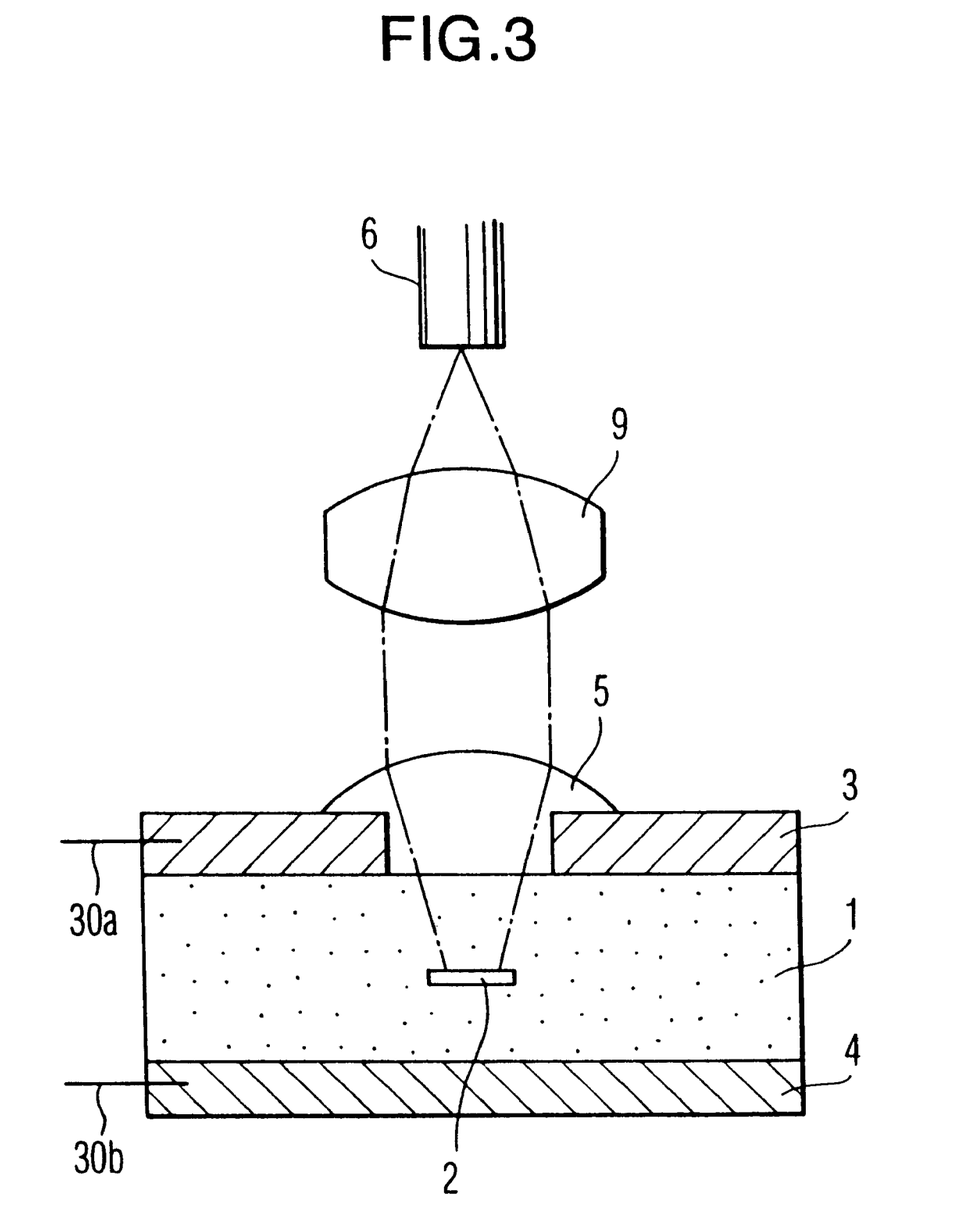
FIG. 3 is a schematic sectional view showing a state of optical coupling between a light-emitting device according to a third embodiment of the invention and an optical fiber.

FIG. 3 is a schematic sectional view showing a state of optical coupling between a light-emitting device according to a third embodiment of the invention and an optical fiber. In FIG. 3, since the light-emitting element 1, light-emitting surface 2, upper electrode 3, lower electrode 4, lens 5, optical fiber 6, and lead wires 30a, 30b are the same as those of the first embodiment, and so they are designated by the same reference numerals, respectively, and explanation thereof is omitted. Further, in FIG. 3, the reference numeral 9 denotes a lens. The lens 9 may be a spherical lens, an aspheric lens, a cylindrical lens and the like, but it is not specially limited so far as it is a lens of the type that can converge the parallel rays. As shown in FIG. 3, light emitted from the light-emitting surface 2 is focused with the lens 5 into a parallel beam which, after passing through the lens 9 which is a separate part and disposed between the light-emitting device and the optical fiber 6, is converged and optically coupled to the optical fiber 6.

As described above, according to this embodiment, light emitted from the light-emitting surface is focused into a parallel beam through the lens, which is made of radiation sensitive resin and formed directly on the light-emitting element and then passed through another separate lens so as to be optically coupled to the optical fiber, and therefore it is possible to increase the tolerance required for aligning the optical axes of the light-emitting element and the optical fiber in both horizontal and vertical directions of the optical axis, thereby further simplifying the optical axis alignment.

Incidentally, in this embodiment, while the number of light-emitting surfaces in the light-emitting element is one, a plurality of lenses may be formed directly on a light-emitting element having a plurality of light-emitting surfaces so as to be located jut above the respective light-emitting surfaces. Further, in the first to third embodiments, it is also possible that a lens (or lenses) made of radiation sensitive resin is formed directly on a foundation film formed on the surface of the light-emitting element.

Figure 4A:
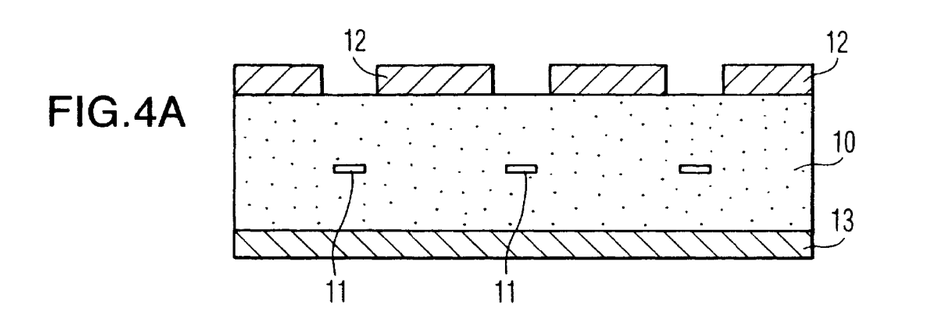
FIG. 4A is a schematic sectional view of a light-emitting element wafer.
Figure 4B:
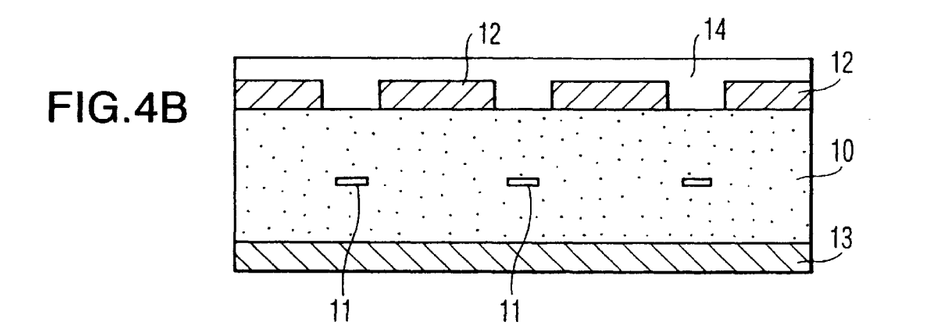
FIG. 4B is a schematic sectional view of a light-emitting element wafer, in which a resist layer is formed by a resist layer forming step according to a fourth embodiment of the invention.
Figure 4C:
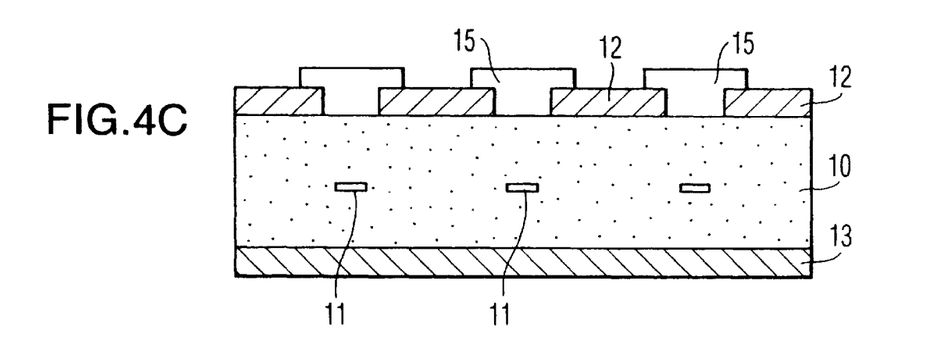
FIG. 4C is a schematic sectional view of the light-emitting element wafer, in which the resist layer is formed only in the portions just above light-emitting surfaces by a resist layer removing step according to the fourth embodiment of the invention.
Figure 4D:
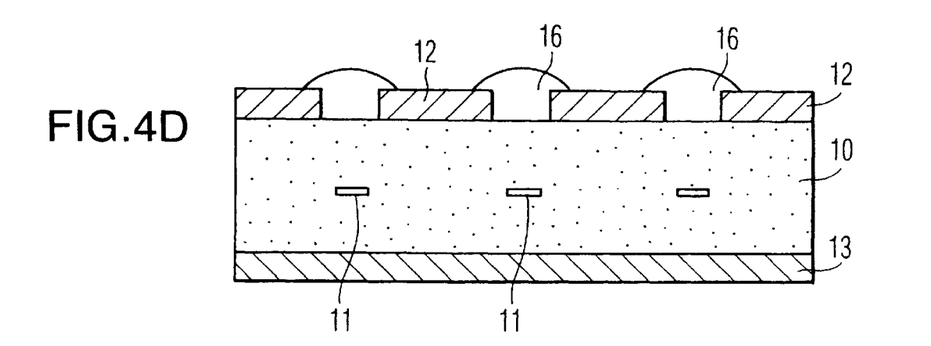
FIG. 4D is a schematic sectional view of the light-emitting element wafer, in which pseudo-hemispheric lenses are formed by a resist layer shaping step according to the fourth embodiment of the invention.

FIG. 4A is a schematic sectional view of a light-emitting element wafer, FIG. 4B is a schematic sectional view of the light-emitting element wafer, in which a resist layer is formed by a resist layer forming step according to a fourth embodiment of the invention, FIG. 4C is a schematic sectional view of the light-emitting element wafer, in which the resist layer is formed only in the portions just above light-emitting surfaces by a resist layer removing step according to the fourth embodiment of the invention, and FIG. 4D is a schematic sectional view of the light-emitting element wafer in which pseudo-hemispheric lenses are formed by a resist layer shaping step according to the fourth embodiment of the invention. In FIGS. 4A to 4D, the reference numeral 10 denotes a light-emitting element wafer, 11 a light-emitting surface, 12 an upper electrode layer, 13 a lower electrode layer, 14 a resist layer, 15 a local resist layer, and 16 a lens. The light-emitting element wafer may be a surface luminous type semiconductor laser wafer, a surface luminous type LED and the like.

Description will be given of a light-emitting device manufacturing method according to this embodiment with reference to FIGS. 4A to 4D. The light-emitting element wafer 10 having a plurality of one light-emitting surfaces 11 as shown in FIG. 4A is formed with the resist layer 14 made of radiation sensitive resin on a surface thereof through which light is emitted, as shown in FIG. 4B. Subsequently, the so called photolithography technology is used such that portions of the resist layer 14 just above the light-emitting surfaces 11 is masked by chrome mask or the like and then it undergoes exposure to ultraviolet light, developing and rinsing, for removal of the resist layer 14 except the local resist layers 15 left on the light-emitting element wafer 10 as shown in FIG. 4C. Succeedingly, the light-emitting element wafer 10 is sufficiently dehydrated and the local resist layers 15 are subjected to postexposure, and then the light-emitting element wafer 10 is heated to shape each of the local resist layers 15 into a hemispheric or pseudo-hemispheric form, thereby forming the lenses 16 directly on the light-emitting element wafer 10 as shown in FIG. 4D. Then, passing through the process of cutting the light-emitting element wafer 10 into chips of a predetermined size (not shown) and the process of connecting lead wires to each of the chips (not shown), the light-emitting device is completed.

As described above, according to this embodiment, the photolithography technology is used to form the lens made of radiation sensitive resin directly on the light-emitting element wafer, and therefore it is possible to highly productively manufacture the highly reliable light-emitting device which is capable of allowing the optical axes of the light-emitting element and the optical fiber to be aligned more easily and making sure of optical coupling between them with high efficiency.

Figure 5A:
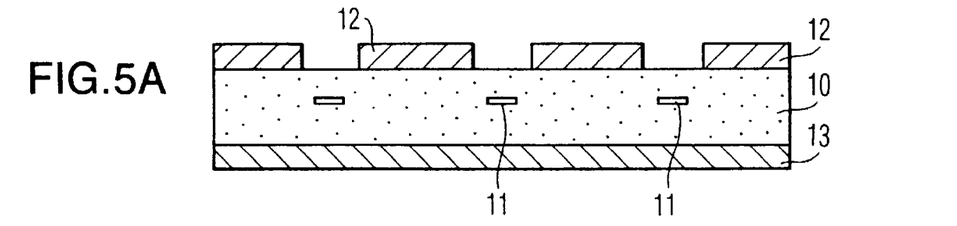
FIG. 5A is a schematic sectional view of another light-emitting element wafer.
Figure 5B:
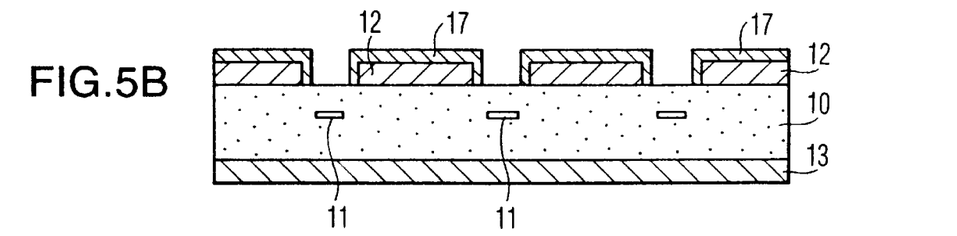
FIG. 5B is a schematic sectional view of a light-emitting element wafer, in which a foundation film is formed by a foundation film forming step according to a fifth embodiment of the invention.
Figure 5C:
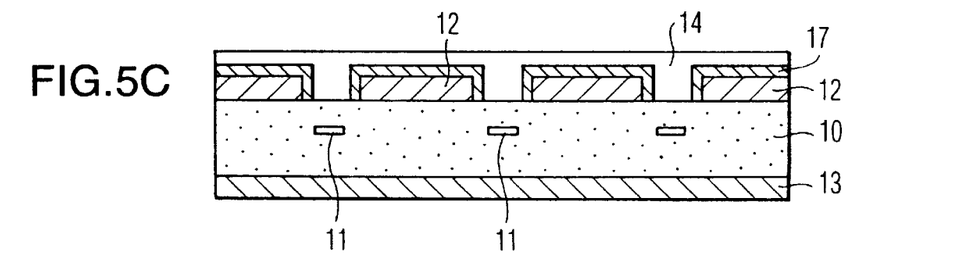
FIG. 5C is a schematic sectional view of the light-emitting element wafer, in which a resist layer is formed on the foundation film by a resist layer forming step according to the fifth embodiment of the invention.
Figure 5D:
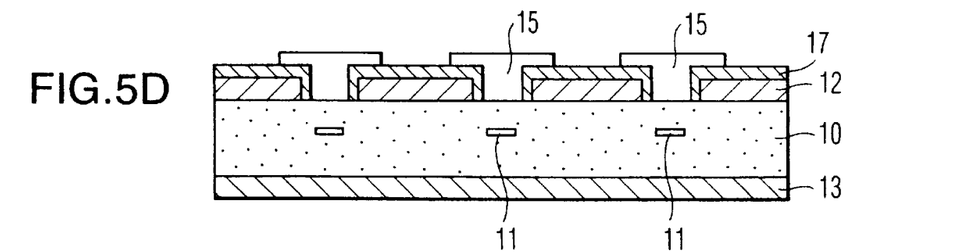
FIG. 5D is a schematic sectional view of the light-emitting element wafer, in which the resist layer is formed only in the portions just above light-emitting surfaces by a resist layer removing step according to the fifth embodiment of the invention.
Figure 5E:
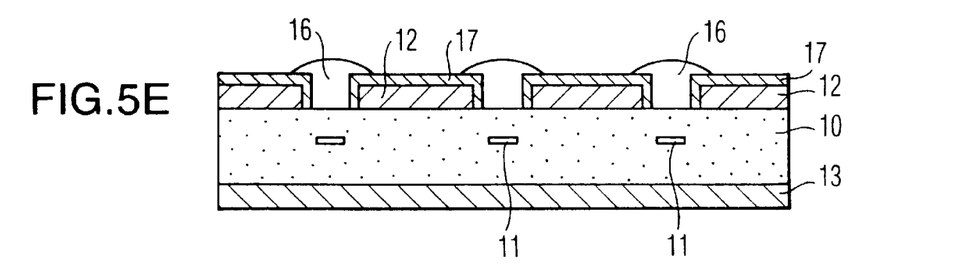
FIG. 5E is a schematic sectional view of the light-emitting element wafer, in which pseudo-hemispheric lenses are formed by a resist layer shaping step according to the fifth embodiment of the invention.

FIG. 5A is a schematic sectional view of a light-emitting element wafer, FIG. 5B is a schematic sectional view of the light-emitting element wafer, in which a foundation film is formed by a foundation film forming step according to a fifth embodiment of the invention, FIG. 5C is a schematic sectional view of the light-emitting element wafer, in which a resist layer is formed on the foundation film by a resist layer forming process according to the fifth embodiment of the invention, FIG. 5D is a schematic sectional view of the light-emitting element wafer, in which the resist layer is formed only in the portions just above light-emitting surfaces by a resist layer removing step according to the fifth embodiment of the invention, and FIG. 5E is a schematic sectional view of the light-emitting element wafer, in which pseudo-hemispheric lenses are formed by a resist layer shaping step according to the fifth embodiment of the invention. In FIGS. 5A to 5E, the reference numeral 17 denotes a foundation film. The light-emitting element wafer 10, light-emitting surface 11, upper electrode layer 12, lower electrode layer 13, resist layer 14, local resist layer 15 and lens 16 are the same as those of the fourth embodiment, and therefore they are designated by the same reference numerals, respectively, and description thereof is omitted.

Referring to FIGS. 5A to 5E, a light-emitting device manufacturing method according to this embodiment will be described below. The foundation film 17 is formed on a surface of the light-emitting element wafer 10 having a plurality of light-emitting surfaces 11 as shown in FIG. 5A through which light is emitted, by applying a coat of foundation material on that surface and then heating it, as shown in FIG. 5B. The resist layer 14 made of radiation sensitive resin is next formed on the foundation film 17 as shown in FIG. 5C. Subsequently, the so-called photolithography technology is performed such that portions of the resist layer 14 located just above the light-emitting surfaces 11 is masked by chrome mask or the like and then undergo exposure to ultraviolet light, developing and rinsing, so as to remove the resist layer 14 from the light-emitting element wafer 10 except for the local resist layers 15 as shown in FIG. 5D. Furthermore, after the light-emitting element wafer 10 is sufficiently dehydrated and the local resist layers 15 are subjected to postexposure, the light-emitting element wafer 10 is heated to shape each of the local resist layer 15 into a hemispheric or pseudo-hemispheric form, thereby forming the lenses 16 directly on the foundation film 17. Then, after going through the process of cutting the light-emitting element wafer 10 into chips of a predetermined size (not shown) and the process of connecting lead wires to each chip (not shown), a light-emitting device of the type, in which the lens 16 is formed directly on the foundation film 17 formed on the light-emitting element wafer 10, is completed.

As described above, according to this embodiment, unevenness of the surface of the light-emitting element is smoothed with the foundation film, and therefore it is possible to highly productively manufacture a highly reliable light-emitting device capable of allowing the optical axes of the light-emitting element and optical fiber to be aligned more easily and making highly efficient optical coupling between them as well as high clinging performance between the light-emitting device and the lens.

EXAMPLE 1

In order that formed on a semiconductor laser wafer having a plurality of light-emitting surfaces be lenses used to converge rays of emitted light so as to form a spot of diameter 10 $\mu$m at a focal length of about 500 $\mu$m, radiation sensitive resin (MFR326 made by Nippon Synthetic Rubber Co., Ltd.: refractive index 1.54, positive type) was applied by a spin coat method on that surface of the semiconductor laser wafer, through which light will be emitted, and then subjected to heat treatment at 90° C. for three minutes to thereby form a resist layer of 3 $\mu$m thickness. Portions of the semiconductor laser wafer having the resist layer thus formed thereon which were located just above the light-emitting surfaces, were masked by chrome masks of diameter 50 $\mu$m and then subjected to exposure to ultraviolet light (i-rays, radiation energy 100 mJ/cm$^2$) applied from above the resist layer. Thereafter, the semiconductor laser wafer was immersed for developing in a 1.4 percent solution of tetramethyl ammonium hydride in water (made by Nippon Synthetic Rubber Co, Ltd) at 25° C. for one minute, and then rinsed with ultrapure water at 25° C. for twenty seconds, thereby removing the resist layer from the semiconductor laser wafer except for the resist layer of diameter about 50

μm left just above each light-emitting surface. After this semiconductor laser wafer was sufficiently dehydrated and exposed to ultraviolet light (i-rays, radiation energy 300 mJ/cm$^2$) applied from above the resist layer, it was heated on a hot plate at 140° C. for ten minutes so that the resist layer just above each light-emitting surface was melted to be shaped into a pseudo-hemispheric form, thereby forming a lens made of radiation sensitive resin just above each light-emitting surface. The semiconductor laser wafer having the lenses formed thereon was cut into chips of a predetermined size, and then lead wires were connected to upper and lower electrodes of each of the chips, thus producing a semiconductor laser with lens function. An electric current of 12 mA was passed through the lead wires of the thus-produced semiconductor laser so as to cause the same to emit light, in which case the light having passed through the lens proved to be converged to form a spot of diameter 10 μm at a point 450 μm away from the upper electrode of the semiconductor laser.

Incidentally, the requirements in this example need to be changed and/or optimized individually according to the light-emitting conditions for the surface luminous type semiconductor laser, desired focal length and desired spot size.

EXAMPLE 2

In order that lenses used to focus rays of emitted light into a parallel beam of diameter 30 μm is formed on a semiconductor laser wafer having a plurality of light-emitting surfaces, radiation sensitive resin (MFR326 made by Nippon Synthetic Rubber Co., Ltd.: refractive index 1.54, positive type) was applied by a spin coat method on that surface of the semiconductor laser wafer through which light will be emitted, and then subjected to heat treatment at 90° C. for three minutes to thereby form a resist layer of 3 μm thickness. The semiconductor laser wafer having the resist layer thus formed thereon was masked such that chrome masks of diameter 60 μm cover portions of the semiconductor laser wafer of located just above the light-emitting surfaces, and then subjected to exposure to ultraviolet light (i-rays, radiation energy 100 mJ/cm$^2$) applied from above the resist layer. Thereafter, the semiconductor laser wafer was immersed for developing in a 1.4 percent solution of tetramethyl ammonium hydride in water (made by Nippon Synthetic Rubber Co, Ltd) at 25° C. for one minute, and then rinsed with ultrapure water at 25° C. for twenty seconds, thereby removing the resist layer from the semiconductor laser wafer except for portions of the resist layer of diameter about 60 μm left just above each light-emitting surface. After this semiconductor laser wafer was sufficiently dehydrated and exposed to ultraviolet light (i-rays, radiation energy 300 mJ/cm$^2$) applied from above the resist layer, it was heated on a hot plate at 130° C. for six minutes so that the resist layer just above each light-emitting surface was melted to be shaped into a pseudo-hemispheric form, thereby forming a lens made of radiation sensitive resin just above each light-emitting surface. The semiconductor laser wafer having the lenses formed thereon was cut into chips of a predetermined size, and then lead wires were connected to upper and lower electrodes of each of the chips, thus producing a semiconductor laser with lens function. An electric current of 12 mA was passed through the lead wires of the thus-produced semiconductor laser so as to cause the same to emit light, in which case the light having passed through the lens proved to be focused into a parallel beam of diameter 28 μm, diverging at a divergence angle of not more than 0.1°, at a point 1 mm away from the upper electrode of the semiconductor laser.

Incidentally, the requirements in this example need to be changed and/or optimized individually according to the light-emitting conditions for the surface luminous type semiconductor laser, desired focal length and desired spot size.

EXAMPLE 3

In order that lenses used to converge rays of emitted light so as to form a spot of diameter 40 μm at a focal length of about 500 μm be formed on a LED wafer having a plurality of light-emitting surfaces, a foundation material (LC-700 made by Nippon Synthetic Rubber Co., Ltd.) was applied by a spin coat method on that surface of the LED wafer through which light will be emitted, and then subjected to heat treatment at 150° C. for ten minutes to thereby form a foundation film of 1.0 μm thickness. Moreover, radiation sensitive resin (MFR326 made by Nippon Synthetic Rubber Co., Ltd.: refractive index 1.54, positive type) was applied on the foundation film by the spin coat method, and then subjected to heat treatment at 90° C. for three minutes to thereby form a resist layer of 2.5 μm thickness. The LED wafer having the resist layer thus formed thereon was masked such that chrome masks of diameter 70 μm covered portions of the LED wafer located just above the light-emitting surfaces, and then subjected to exposure to ultraviolet light (i-rays, radiation energy 100 mJ/cm$^2$) applied from above the resist layer. Thereafter, the LED wafer was immersed for developing in a 1.4 percent solution of tetramethyl ammonium hydride in water (made by Nippon Synthetic Rubber Co, Ltd) at 25° C. for one minute, and then rinsed with ultrapure water at 25° C. for twenty seconds, so that the resist layer was removed from the LED wafer except for portions of the resist layer of diameter about 70 μm left just above each light-emitting surface. After such LED wafer was sufficiently dehydrated and exposed to ultraviolet light (i-rays, radiation energy 300 mJ/cm$^2$) on a side of the resist layer, it was heated on a hot plate at 140° C. for eight minutes so that the resist layer just above each light-emitting surface was melted and molded into a pseudo-hemispheric form to form a lens made of radiation sensitive resin just above each of the light-emitting surfaces of the LED wafer. The LED wafer having the lenses formed thereon was cut into chips of a predetermined size, and then lead wires were connected to upper and lower electrodes of each of the chips, to produce a LED with lens function. An electric current of 20 mA was passed through the lead wires of the thus-produced LED so as to cause the same to emit light, in which case the light having passed through the lens proved to be converged to form a spot of diameter 40 μm at a point 600 μm away from the upper electrode of the LED.

Incidentally, the requirements in this example need to be changed and/or optimized individually according to the light-emitting conditions for the surface luminous type LED, desired focal length and desired spot size.

The light-emitting device of the present invention maskes it possible to reduce the number of parts required for optical coupling between the light-emitting element and the optical fiber and hence the optical axis alignment can be simplified, so that there can be obtained an excellent effect that it becomes possible to provide a low-cost optical semiconductor module which makes a highly efficient coupling to the optical fiber. Further, since the photolithographic technology is applied to form the lens directly on the light-emitting element, there is provided an excellent effect that it becomes possible to provide an optical semiconductor module using a highly stable and reliable light-emitting device. Moreover, according to the light-emitting device manufacturing method of the invention, it is possible to highly productively manufacture the light-emitting device which can simplify the optical axis alignment when it is coupled to the optical fiber, and therefore an excellent effect can be obtained that it is possible to reduce the production cost of the light-emitting device with lens function and hence to provide a low-cost light-emitting device with lens function.

What is claimed is:

1. A light-emitting device having a lens which is made of a resin and formed directly above a light-emitting surface of a light-emitting element said resin having a radiation hardening property and a thermosetting property said resin having a property such that it can be softened by heat treatment after it is hardened upon application of radiation, and rehardened after said heat treatment, with thermal deformation resistance and light transparency being imparted to the resulting resin after said hardening.

2. A light-emitting device according to claim 1, wherein said resin is one selected from a group of radiation sensitive resin compositions comprising:

a composition containing an alkali-soluble resin, a radiation sensitive acid forming compound and a compound having at least two epoxy groups;

a composition containing an alkali-soluble polymer which is a homopolymer of a p-hydroxy styrene class or a copolymer of a p-hydroxy styrene class and in which structure units originating from the p-hydroxy styrene class occupy at least 70 mole percent, a 1,2 naphthoquinonediazido sulfonic acid ester and a compound having at least two epoxy groups, a composition containing an alkali-soluble resin, a 1,2 quinonediazido compound, a compound having two or more epoxy groups, a melamine class resin, and a trihalomethyl triazine class or onium salt class resin, and a composition containing an unsaturated carboxylic acid and/or an unsaturated carboxylic acid anhydride, an epoxy group containing radical polymeric compound, and a resin and radiation absorbent compound made of a copolymer of mono- and/or diolefin based unsaturated compound.

3. A light-emitting device according to claim 2, wherein said light-emitting element has a plurality of said light-emitting surfaces and a plurality of said lenses associated with said respective light-emitting surfaces.

4. A light-emitting device according to claim 3, wherein said light-emitting element is a surface luminous type semiconductor laser or a surface luminous type LED.

5. A light-emitting device according to claim 4, wherein rays of light emitted from said light-emitting element to pass through said lens are converged to form a spot of a predetermined diameter at a predetermined point.

6. A light-emitting device according to claim 5, wherein said spot diameter is in the range of 8 to 60 μm, preferably in the range of 10 to 50 μm.

7. A light emitting device according to claim 4, wherein rays of light emitted from said light-emitting element to pass through said lens are focused into a parallel beam in a predetermined direction.

8. A light-emitting device according to claim 3, wherein rays of light emitted from said light-emitting element to pass through said lens are converged to form a spot of a predetermined diameter at a predetermined point.

9. A light-emitting device according to claim 8, wherein said spot diameter is in the range of 8 to 60 μm, preferably in the range of 10 to 50 μm.

10. A light emitting device according to claim 3, wherein rays of light emitted from said light-emitting element to pass through said lens are focused into a parallel beam in a predetermined direction.

11. A light-emitting device according to claim 2, wherein said light-emitting element is a surface luminous type semiconductor laser or a surface luminous type LED.

12. A light-emitting device according to claim 19, wherein rays of light emitted from said light-emitting element to pass through said lens are converged to form a spot of a predetermined diameter at a predetermined point.

13. A light-emitting device according to claim 12, wherein said spot diameter is in the range of 8 to 60 μm, preferably in the range of 10 to 50 μm.

14. A light emitting device according to claim 11, wherein rays of light emitted from said light-emitting element to pass through said lens are focused into a parallel beam in a predetermined direction.

15. A light-emitting device according to claim 2, wherein rays of light emitted from said light-emitting element to pass through said lens are converged to form a spot of a predetermined diameter at a predetermined point.

16. A light-emitting device according to claim 15, wherein said spot diameter is in the range of 8 to 60 μm, preferably in the range of 10 to 50 μm.

17. A light emitting device according to claim 2, wherein rays of light emitted from said light-emitting element to pass through said lens are focused into a parallel beam in a predetermined direction.

18. A light-emitting device according to claim 1, further comprising upper and lower electrodes, and wherein said upper electrode is formed on a portion of said light-emitting element but is not formed directly above the light-emitting surface of said light-emitting element.

19. A light-emitting device according to claim 18, wherein said light-emitting element is a surface luminous type semiconductor laser or a surface luminous type LED.

20. A light-emitting device according to claim 19, wherein rays of light emitted from said light-emitting element to pass through said tens are converged to form a spot of a predetermined diameter at a predetermined point.

21. A light-emitting device according to claim 20, wherein said spot diameter is in the range of 8 to 60 μm, preferably in the range of 10 to 50 μm.

22. A light emitting device according to claim 19, wherein rays of light emitted from said light-emitting element to pass through said lens are focused into a parallel beam in a predetermined direction.

23. A light-emitting device according to claim 18, wherein rays of light emitted from said light-emitting element to pass through said lens are converged to form a spot of a predetermined diameter at a predetermined point.

24. A light-emitting device according to claim 23, wherein said spot diameter is in the range of 8 to 60 μm, preferably in the range of 10 to 50 μm.

25. A light emitting device according to claim 18, wherein rays of light emitted from said light-emitting element to pass through said lens are focused into a parallel beam in a predetermined direction.

26. A light-emitting device according to claim 1, wherein said light-emitting element is a surface luminous type semiconductor laser or a surface luminous type LED.

27. A light-emitting device according to claim 26, wherein rays of light emitted from said light-emitting element to pass through said lens are converged to form a spot of a predetermined diameter at a predetermined point.

28. A light-emitting device according to claim 27, wherein said spot diameter is in the range of 8 to 60 μm, preferably in the range of 10 to 50 μm.

29. A light emitting device according to claim 26, wherein rays of light emitted from said light-emitting element to pass through said lens are focused into a parallel beam in a predetermined direction.

30. A light-emitting device according to claim 1, wherein rays of light emitted from said light-emitting element to pass through said lens are converged to form a spot of a predetermined diameter at a predetermined point.

31. A light-emitting device according to claim 30, wherein said spot diameter is in the range of 8 to 60 μm, preferably in the range of 10 to 50 μm.

32. A light-emitting device according to claim 1, wherein rays of light emitted from said light-emitting element to pass through said lens are focused into a parallel beam in a predetermined direction.

* * * * *